(12) United States Patent
Livshits et al.

(10) Patent No.: US 8,826,242 B2
(45) Date of Patent: Sep. 2, 2014

(54) DATA DRIVEN PROFILING FOR DISTRIBUTED APPLICATIONS

(75) Inventors: Benjamin Livshits, Redmond, WA (US); William GJ Halfond, Redmond, WA (US); Jeffrey Van Gogh, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1566 days.

(21) Appl. No.: 11/945,685

(22) Filed: Nov. 27, 2007

(65) Prior Publication Data
US 2009/0138858 A1 May 28, 2009

(51) Int. Cl.
*G06F 9/44* (2006.01)
*G06F 9/45* (2006.01)
*G06F 15/173* (2006.01)

(52) U.S. Cl.
USPC ........... 717/130; 717/103; 717/127; 717/158; 709/224

(58) Field of Classification Search
None
See application file for complete search history.

(56) References Cited

U.S. PATENT DOCUMENTS

| | | | | |
|---|---|---|---|---|
| 5,691,917 A * | 11/1997 | Harrison | | 717/127 |
| 5,781,778 A * | 7/1998 | Meier et al. | | 717/127 |
| 6,721,941 B1 | 4/2004 | Morshed et al. | | |
| 6,742,143 B2 | 5/2004 | Kaler et al. | | |
| 6,751,573 B1 * | 6/2004 | Burch | | 702/178 |
| 6,760,903 B1 | 7/2004 | Morshed et al. | | |
| 7,039,919 B1 | 5/2006 | Hunt | | |
| 7,171,654 B2 * | 1/2007 | Werme et al. | | 717/130 |
| 7,287,247 B2 * | 10/2007 | Gschwind et al. | | 717/130 |
| 7,454,761 B1 * | 11/2008 | Roberts et al. | | 719/318 |
| 7,523,198 B2 * | 4/2009 | Wu et al. | | 709/224 |
| 7,600,014 B2 * | 10/2009 | Russell et al. | | 709/224 |
| 7,840,575 B2 * | 11/2010 | Chandrasekaran | | 707/754 |
| 2002/0174415 A1 * | 11/2002 | Hines | | 717/127 |
| 2004/0010570 A1 | 1/2004 | Kaler et al. | | |
| 2004/0054984 A1 * | 3/2004 | Chong et al. | | 717/103 |
| 2004/0100566 A1 * | 5/2004 | Valleriano et al. | | 348/231.99 |
| 2004/0220947 A1 | 11/2004 | Aman et al. | | |
| 2005/0010930 A1 | 1/2005 | Vaught | | |
| 2005/0091373 A1 | 4/2005 | Ciapala et al. | | |
| 2006/0235947 A1 | 10/2006 | Gray et al. | | |
| 2007/0093986 A1 * | 4/2007 | Armstead et al. | | 702/182 |
| 2007/0168968 A1 * | 7/2007 | Bates et al. | | 717/124 |
| 2007/0271573 A1 * | 11/2007 | Chandrasekaran | | 719/318 |
| 2008/0109796 A1 * | 5/2008 | Kosche | | 717/158 |
| 2008/0275951 A1 * | 11/2008 | Hind et al. | | 709/204 |

OTHER PUBLICATIONS

Marcos K. Aguilera et al., "Performance Debugging for Distributed Systems of Black Boxes", [Online], ACM 2003, pp. 1-16, [Retrieved from Internet on Apr. 8, 2014], <http://pdos.csail.mit.edu/~athicha/papers/blackboxes:sosp03.pdf>.*

(Continued)

*Primary Examiner* — Thuy Dao
*Assistant Examiner* — Ziaul A Chowdhury
(74) *Attorney, Agent, or Firm* — Dan Choi; Carole Boelitz; Micky Minhas

(57) ABSTRACT

An exemplary method includes providing an application that includes client-side code and server-side code, instrumenting the client-side code and the server-side code to generate timestamps, distributing the instrumented client-side code and the instrumented server-side code and monitoring timestamps generated during execution of the application. In such a method, where timestamps generated by the client-side code and timestamps generated by the server-side code occur along a common timeline, a developer can monitor performance of the distributed application. Other exemplary methods, systems, etc., are also disclosed.

20 Claims, 16 Drawing Sheets

(56) References Cited

OTHER PUBLICATIONS

Jan Schaefer et al., "Model-Based Performance Instrumentation of Distributed Applications",[Online], Springer, 2008, pp. 210-223, [Retrieved from Internet on Apr. 8, 2014], <http://download.springer.com/static/pdf/914/chp%253A10.1007%252F978-3-540-68642-2_17.pdf>.*

Sandip Agarwala et al., "E2EProf: Automated End-to-End Performance Management for Enterprise Systems", [Online], G. Tech. 2004, pp. 1-11, [Retrieved from Internet on Apr. 8, 2014], <https://smartech.gatech.edu/bitstream/handle/1853/14352/git-cercs-07-02.pdf>.*

Omprakash Gnawali et al., "The Tenet Architecture for Tiered Sensor Networks", [Online], ACM 2006, pp. 153-166, [Retrieved from Interent on Apr. 8, 2014], <http://delivery.acm.org/10.1145/1190000/1182823/p153-greenstein.pdf>.*

Gschwind, et al., "WebMon: A Performance Profiler forWeb Transactions", at <<http://www.infosys.tuwien.ac.at/Staff/tom/Publications/Gschwind2002-webmon.pdf>>, IEEE, 2002, pp. 6.

Srivastava, et al., "Monitoring in .Net Distributed Application Design", at <<http://msdn2.microsoft.com/en-us/library/ms954612.aspx>>, Microsoft Corporation, 2007, pp. 17.

"Tool Report: Enterprise Application Profiler in Sun's Java Studio Enterprise", at <<http://www.javaperformancetuning.com/tools/EAProfiler/>>, Jan. 2006, pp. 12.

* cited by examiner

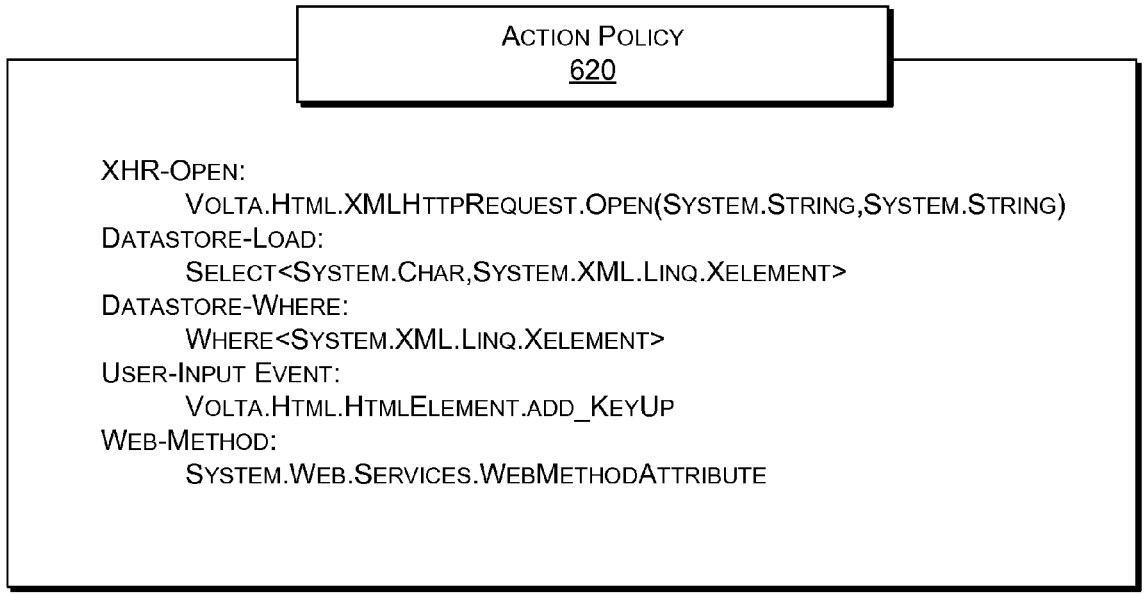
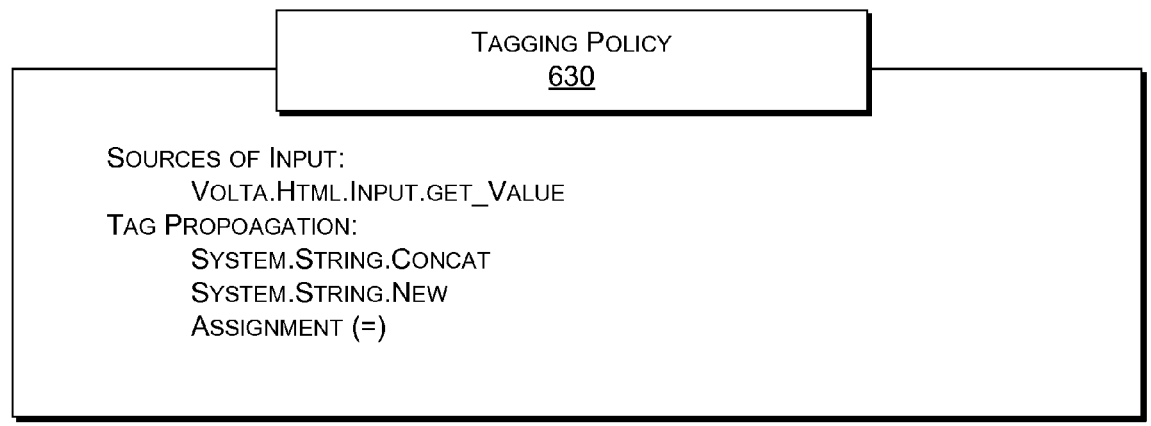
FIG. 7

| EXEMPLARY CLIENT-SIDE INFORMATION 910 ||| 
|---|---|---|
| SYSTEM EVENTS | CONTROL FLOW EVENTS | INFORMATION FLOW EVENTS |
|  | → KEY PRESS EVENT | VAR INPUT = INPUT.GET() |
|  |  | INP = INP.TRIM() |
|  |  | VAR REQUEST = "HTTP:…/?PARAM=" + INP.; |
|  | → XHR SEND |  |
| → DNS LOOKUP |  |  |
| ← DNS LOOKUP |  |  |
|  | ← XHR SEND |  |
|  | ← KEY PRESS EVENT |  |

| EXEMPLARY SERVER-SIDE INFORMATION 930 ||| 
|---|---|---|
| SYSTEM EVENTS | CONTROL FLOW EVENTS | INFORMATION FLOW EVENTS |
| → ASP.NET RP |  |  |
|  | → WEBMETHOD CALL | QUERY="SELECT*FROM FOO WHERE USER="+PARAM; |
|  | → DB QUERY CALL |  |
| → DB QUERY PARSE |  |  |
| → DB SELECT |  |  |
| ← DB SELECT |  |  |
| ← DB QUERY PARSE |  |  |
|  | ← DB QUERY CALL |  |
|  |  | RESULT=CON.GETRESULT() + ";" |
|  | ← WEBMETHOD CALL |  |
| ← ASP.NET RP |  |  |
|  | ← XHR SENDING RESPONSE |  |

FIG. 9

EXEMPLARY CLIENT SIDE INSTRUMENTATION 1010

　ACTIONS　　　　INFO FLOW class Program
    public static Dictionary D = new Dictionary();
    static void Main(string[] args)
    var input = (Input)Browser.Document["input"];
        var pane = new Div();
            Browser.Document.Body.AppendChild(pane);
            input.KeyUp += delegate
                D.Completions(
                input.Value,
                10, (s) => { pane.InnerHtml = s; });

class Dictionary
    public void Completions(string Prefix, int Count, Action<String> callback)
    var request = new XMLHttpRequest();
    request.ReadyStateChange += delegate
        if (request.ReadyState == 4)
            callback(request.ResponseText);
request.Open("GET", "http://localhost/Completions?Prefix=" + Prefix + "&Count=", true);
request.Send();

FIG. 10

EXEMPLARY SERVER SIDE INSTRUMENTATION 1030

Public Class Dictionary

[Rotunda]
    Public Sub New()
    Dictionary = <?xml version="1.0"?>
        <Dictionary>
            <%= From C In Letters _
            Select XElement.Load(String.Format(Path, C)) %>
        </Dictionary>
    End Sub Public Function Completions(ByVal Prefix As String, ByVal Count As Integer) As Xelement
    Dim Matches = From Entry In Dictionary...<P> _
    Where Prefix.Length > 0 _
    AndAlso Entry.Word.ToLower() Like Prefix.ToLower() & "*"
    Completions = <div><%=Matches.Take(Count)%></div>
    End Function
End Class

FIG. 11

EXEMPLARY WEB-SERVICE INTERFACE INSTRUMENTATION 1050

ACTIONS ☐ INFO FLOW

Public Class Service1 Inherits WebService
    <WebMethod(EnableSession:=True)> _
    Function Completions(Prefix As String, Count As Integer) As XmlDocument
    Completions = New XmlDocument()
    Completions.LoadXml(Me.Dictionary.Completions(Prefix, Count))
    End Function
End Class

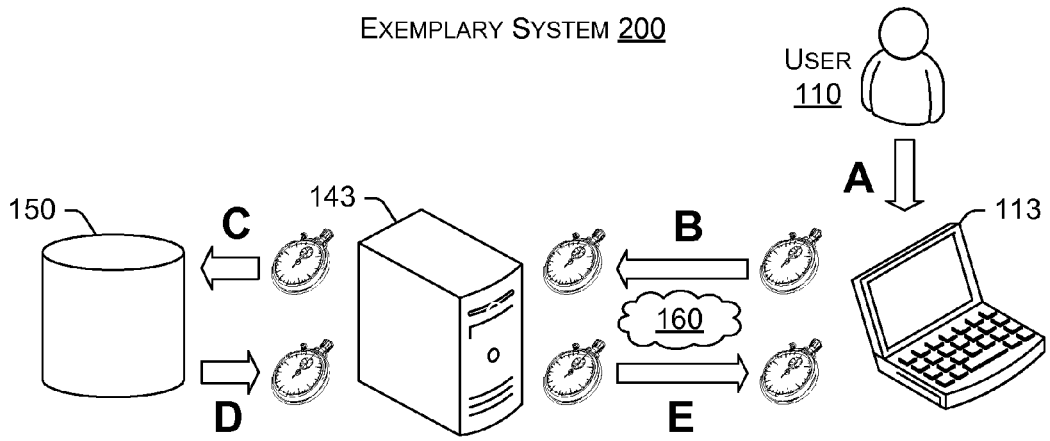

EXEMPLARY SYSTEM 200

EXEMPLARY METHOD 1300

| A 1304 | On User-Input: • assign next sequence ID | On Page Load: • assign session ID • initialize sequence IDs | Session ID Sequence ID Timestamp Message |

| B 1308 | On XHR-Send: • Set HTTP header for Session and Sequence |

| 1312 | On Web-Method Entry: • Extract HTTP header for Session and Sequence • Store headers in thread-local storage | Session ID Sequence ID Timestamp Message |

| C D 1316 | Query Data and Transmit Data |

| 1320 | On Web-Method Exit: • Set corresponding response headers |

| E 1324 | On XHR-Response Access: • Set sequence ID to correspond to sequence ID in HTTP header |

FIG. 13

EXEMPLARY SYSTEM 200

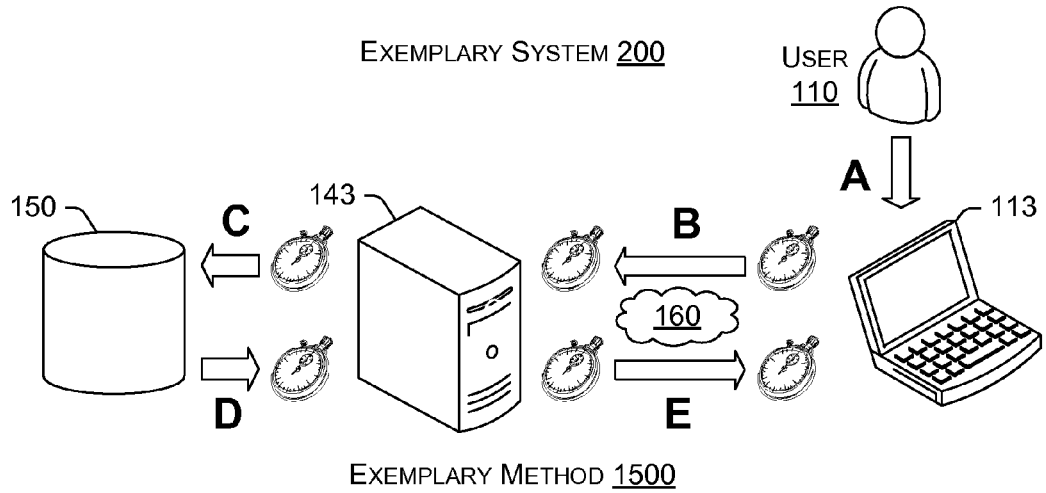

EXEMPLARY METHOD 1500

| A 1504 | User Data | On User-Input, tag input string object |

| 1508 | Client Machine: ($obj_1$, $obj_2$); Timestamp; Sequence ID; Session ID |

| B 1512 | Request User Data |

| 1516 | Server Machine: ($obj_1$, $obj_2$); Timestamp; Sequence ID; Session ID |

| C D 1520 | Query Data and Transmit Data |

| E 1524 | Display Update |

EXEMPLARY STATEMENTS 1570

URL Request:
    Completions?Prefix=" + Prefix + "&Count=" + Count
                    NAME    VALUE    NAME    VALUE On Client Side:
    If VALUE is tagged then Set HTTP tag header true for NAME On Server Side:
    If HTTP tag header for NAME is true then Tag corresponding Web Method parameter

FIG. 15

DATA DRIVEN PROFILING FOR DISTRIBUTED APPLICATIONS

BACKGROUND

Distributed applications are characterized by components that run on different machines, typically in communication via a network, such as the Internet. For example, a shift towards interactive Web 2.0 applications has led to development of truly distributed systems where code is written in different languages, runs on multiple machines, and interacts in complex ways. Today, many such applications are written in an ad-hoc manner, where the server and client-side functionality are developed at the same time—but separately and often in different programming languages—and subsequently combined. This approach, which involves heterogeneous languages and runtime systems, such as the .NET platform (Microsoft Corporation, Redmond, Wash.) or the Java 2 Platform, Enterprise Edition (J2EE) (Sun Microsystems, Inc., Santa Clara, Calif.) platform on the server and the JavaScript interpreter together with dynamic HTML (DHTML) on the client makes development more difficult and error-prone, additionally, it requires developers to master multiple programming languages and paradigms.

To build distributed applications a developer, or developers, may rely on Asynchronous JavaScript and XML (AJAX). AJAX forms a method of building interactive applications for the Web that can process user requests immediately. AJAX combines several programming techniques including JavaScript, DHTML, Extensible Markup Language (XML), cascading style sheets (CSS), the Document Object Model (DOM), and the object, XMLHttpRequest. AJAX allows content on Web pages to update asynchronously when a user performs an action; as opposed to the traditional mechanism in which users must wait for a whole new page to load. For example, using AJAX, a weather forecasting site could update local conditions on one side of the page as a user types in a zip code. AJAX has been the enabling technology behind many of the "Web 2.0" applications that have become very popular.

A recent trend is to develop web applications in a unified manner and then distribute them afterwards through an automatic or semi-automatic technique. Technologies aimed at unified development include the ASP.NET AJAX framework (Microsoft Corp.), Google Web Toolkit (GWT) (Google, Inc., Mountain View, Calif.), Script#, and Volta (Microsoft Corp.). The ASP.NET AJAX framework allows for creation of Web pages that include a rich user experience with responsive user interface (UI) elements. ASP.NET AJAX provides client-script libraries that incorporate cross-browser ECMAScript (JavaScript) and dynamic HTML (DHTML) technologies, and it integrates them with the ASP.NET 2.0 server-based development platform.

AJAX can enhance various aspects of client-server interaction. For example, in a typical client-server interaction in a Web application, a user may initiate an action that causes the user's browser to request a page from a server. The user interacts with the page via the browser and when some action from the user requires data from the server, a complete page refresh occurs to update part of the page based on the input. Unfortunately, this behavior does not allow the user to continue interacting with the page; instead, the user must frequently pause while working with the Web application. AJAX allows a shift away from complete page refreshes. In an ASP.NET AJAX application, the initial HTML is retrieved and subsequent calls to the server get requested data in XML, JavaScript Object Notation (JSON), or snippets of HTML, and can update the page incrementally. The background asynchronous calls invoke Web services or retrieve page changes without forcing users to pause for complete page refresh. These asynchronous calls manage updated view state information for subsequent server postbacks so that when a complete page refresh is necessary, the accurate state of the page is carried to the server.

Unified development approaches are attractive because all code can be developed on a single platform (e.g., a server), then refactored to generated tier-specific code (e.g., client tier, server tier, etc.) and distributed as appropriate. However, such an approach can complicate or even prevent performance tracking and optimization as the connection between a distributed component and its original code can be obscured by the transformations performed on it. However, the need for such performance information is greater because the performance of applications developed in this way can be significantly slower compared to applications that are entirely hand-coded. For example, the Atlas-generated analog of the Google.com/ig homepage (http://dropthings.com) is over an order of magnitude slower than the original. Similarly, distributed application code that is produced by Script# and Volta software may provide less than optimal performance.

With respect to Volta software, this technology provides a framework for unified development of distributed applications. The framework includes a set of tools for refactoring web applications. These tools allow a developer to develop their application without consideration of the distributed nature of the application and then and then automatically refactor the code, for example, into client-side/server-side components, server-side/database-side components, or into a variety of client-side runtime components (e.g., JavaScript, Flash, etc.).

Although unified development environments offer many benefits, they can obscure an explicit understanding of performance, which occurs because many transformations are performed on the code during the automatic distribution process. These transformations make it difficult to correlate slow-running automatically generated code with the original code written by the developer. Another complicating factor is when the application is spread across multiple machines. Even if performance profiling is accomplished through conventional techniques separately on the server and the client, correlating and connecting two separate profiles is a non-trivial problem.

Traditional performance profiling is good at summarizing function- and line-level performance information. However, it is very difficult to elevate this low-level information to the "architectural level.", For example, given function-level performance profiles, how does one answer more high-level questions, such as: "How much time is spent on network activity?", "How much time is spent waiting for the database to retrieve the data?", or "How much time does the client-side processing of data take?". In many case it is much more beneficial to understand application performance in the context of these high-level questions and usage scenarios.

As described herein, various exemplary techniques provide for end-to-end visibility of performance metrics for distributed applications. Such techniques can be applied to applications developed in a unified framework or applications having components developed separately.

SUMMARY

An exemplary method includes providing an application that includes client-side code and server-side code, instrumenting the client-side code and the server-side code to generate timestamps, distributing the instrumented client-side code and the instrumented server-side code and monitoring timestamps generated during execution of the application. In such a method, where timestamps generated by the client-side code and timestamps generated by the server-side code occur along a common timeline, a developer can monitor performance of the distributed application. Other exemplary methods, systems, etc., are also disclosed.

DESCRIPTION OF DRAWINGS

Non-limiting and non-exhaustive examples are described with reference to the following figures:

FIG. 7 is a diagram of exemplary action policy statements and tagging policy statements for the architecture of FIG. 6;

FIG. 9 is an exemplary table of client-side event information and an exemplary table of sever-side event information for a distributed application;

FIG. 10 is an exemplary code segment that includes client-side instrumentation;

FIG. 11 is an exemplary code segment that includes server-side instrumentation;

FIG. 13 is a diagram of an exemplary system and an exemplary method capable of being implemented on the system;

FIG. 15 is a diagram of an exemplary system and an exemplary method capable of being implemented on the system.

DETAILED DESCRIPTION

Various exemplary techniques provide end-to-end visibility of performance metrics for distributed applications. As described below, a distributed application can be "instrumented" by inserting code that generates performance or other information at runtime. This code insertion process is referred to as "instrumenting" as it provides "instruments" for monitoring distributed applications (e.g., performance profiling, etc.). Such techniques can be applied to unified applications or applications having components developed separately. An exemplary approach provides end-to-end visibility into distributed Web 2.0 application performance from the standpoint of a piece of data traveling through the application. For example, a piece of data might originate at the database, be processed by the server-side application, then placed in a network packet and later processed on the client-side, this in turn could lead to another packet on the network to send the update to the server-side database.

An exemplary technique instruments application components at a variety of levels. For example, both the server- and the client-side code can be instrumented in a manner that allows for tracking time and correlating events and/or information flows. A particular exemplary technique provides for inserting instrumentation into existing binaries/assemblies of a distributed application to allow precise tracking of data propagating through the distributed application.

As described in more detail below, various exemplary techniques not only allow for capturing how long a given function takes but allow for recording and mapping an entire process of passing a piece of data (such as an object) through multiple layers of a web application. Such an approach can help find performance bottlenecks in distributed applications (e.g., Web 2.0 applications, etc.).

Figure 1:
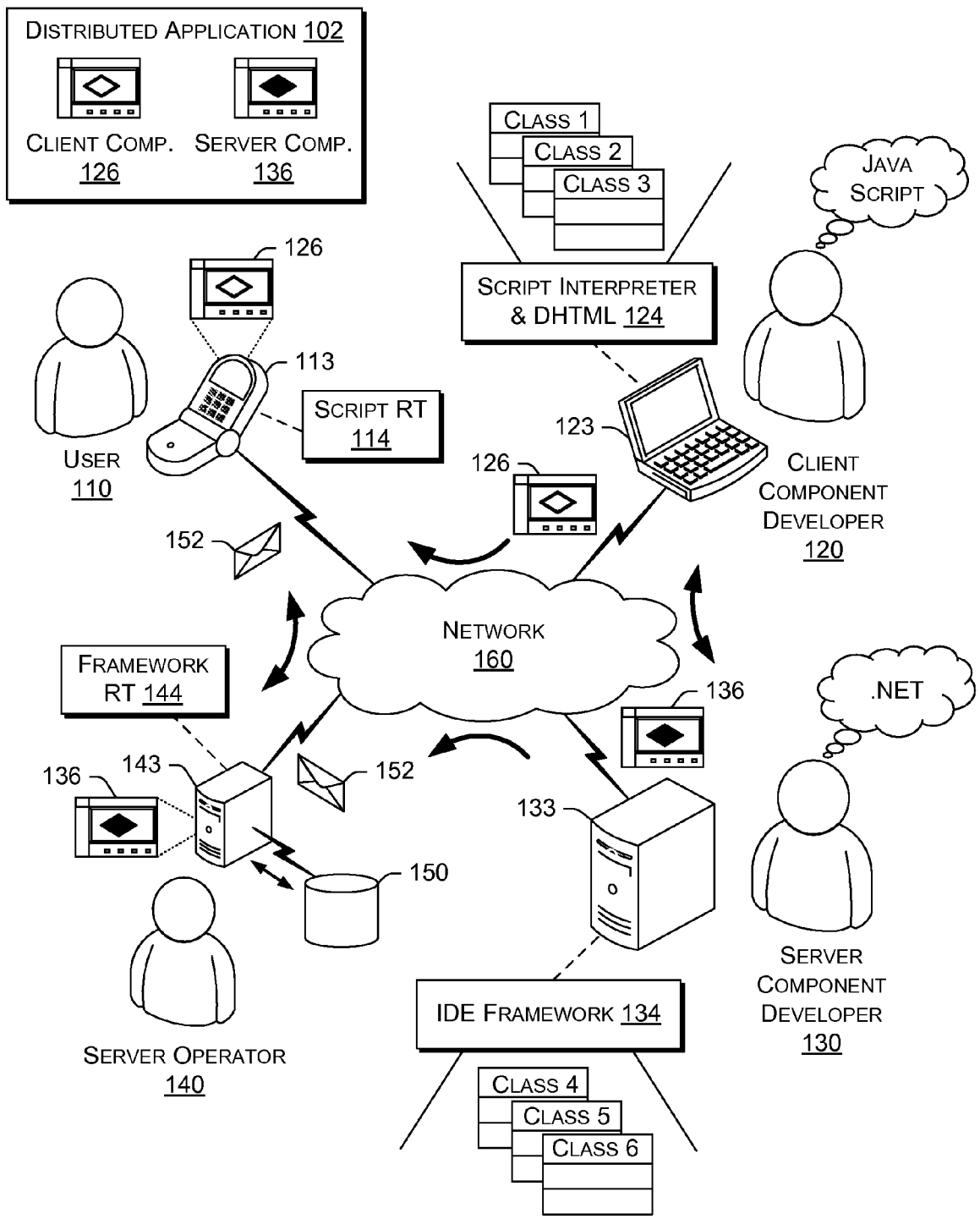
FIG. 1 is a diagram of an exemplary distributed application environment.

FIG. 1 shows an example of a distributed application environment 100. The environment 100 is explained with respect to a distributed application 102 that includes a client-side component 126 and a server-side component 136. The distributed application 102 may be developed in a uniform manner and then split into the client-side component 126 and the server-side component 136 or, as shown, the distributed application 102 may be written in an ad-hoc manner, where the server and client-side functionality are developed separately at roughly the same time by a client component developer 120 and a server component developer 130. In the latter approach, the components can be subsequently combined into a unified distributed application 102 and then appropriately distributed.

More specifically, the client component developer 120 develops the client-side component 126 of the distributed application 102 using a development environment 124 installed on a computer 123. In the example of FIG. 1, the development environment 124 includes a script interpreter (e.g., for JavaScript) and DHTML. The actual client-side component 126 may rely on certain classes specific to client-side operation (e.g., Classes 1, 2 and 3). Similarly, the server component developer 130 develops the server-side component 136 of the distributed application 102 using a development environment 134 installed on a computer 133. In the example of FIG. 1, the development environment 134 is an integrated development environment (IDE) framework (e.g., .NET IDE framework). The actual server-side component 136 may rely on certain classes specific to server-side operation (e.g., Classes 4, 5 and 6). Some degree of interaction may occur between the developers 120 and 130. One of the developers may be responsible for combining and/or distributing the components over a network 160.

In the example of FIG. 1, the distributed application 102 is for email 152 where a server operator 140 operates an email server 143 that includes a framework runtime (RT) 144 for running the server-side component 136. The email server 143 is in communication with a database 150 and the network 160 to allow client-related information storage and information access. A user 110 operates a client device 113 with a script runtime (RT) 114 for executing the client-side component 126, for example, to receive or send email 152.

In the environment 100, the user 110, the client component developer 120, the server component developer 130 and/or the server operator 140 may be interested in how the distributed application 102 performs. For example, the user 110 may be interested in selecting amongst competing email service vendors, the client component developer 120 may be interested in server-side performance, the server component developer 130 may be interested in client-side performance and the server operator 140 may be interested in optimizing server performance and resource utilization (e.g., database, bandwidth, CPU, etc.).

As described herein, various exemplary techniques instrument a distributed application to provide timing and/or other information relevant to performance of the distributed application. Such techniques may be applied on a "tier" basis. For example, the environment 100 includes a client tier associated with client device 113, a server tier associated with server 143 and a database tier associated with database 150. Examples of such tiers and associated actions and information are discussed with respect to FIG. 2.

Figure 2:
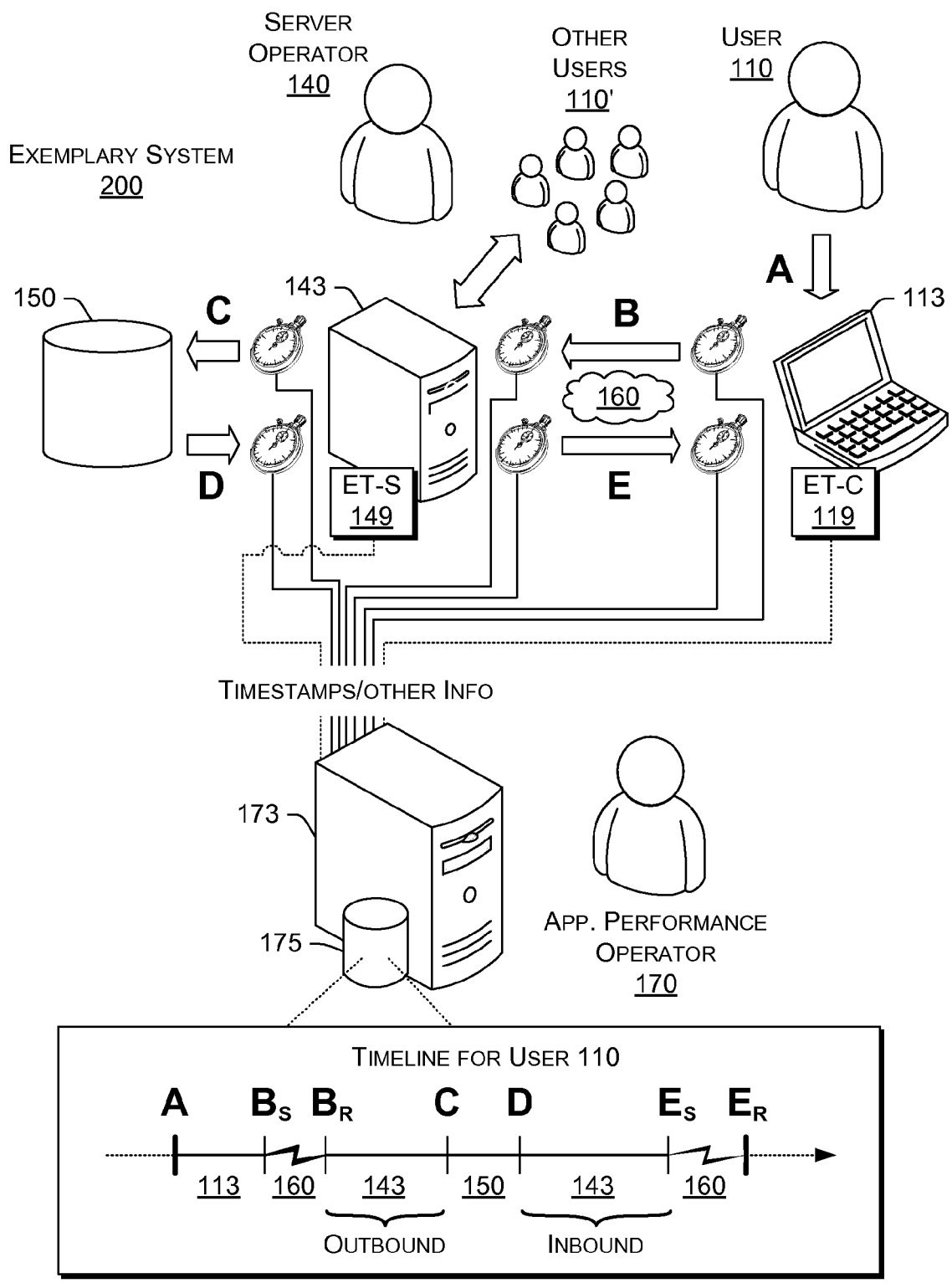
FIG. 2 is a diagram of an exemplary system for data-driven profiling of a distributed application.

FIG. 2 shows an exemplary instrumented system 200 along with an event timeline for a particular user 110, which is one of many users 110'. The system 200 includes various tiers and features as explained with respect to FIG. 1 and additional features for collection of performance metrics. Specifically, the system 200 allows for issuance of timestamps and optionally other information such as information associated with data flow and/or operating system level events of one or more devices of the system 200.

An example process, labeled from A to E, commences at "A" with the user 110 initiating a command on a client machine 113, which optionally includes a client-side, operating system level event tracer module (ET-C) 119. The action of user 110 may be recorded using client-side component instrumentation that issues a timestamp to a logging machine 173 with associated storage 175, for example, under guidance of operator 170. The logging machine 173 (e.g., a logging server) may include a module for requesting and/or monitoring performance information for one or more distributed applications (see, e.g., FIG. 8). For example, the operator 170 may elect to record timestamp information for a distributed application and, optionally, a particular user (e.g., one that has requested help in response to a perceived problem.)

After initiating the command, at time "$B_S$" the machine 113 sends information (e.g., data, command, etc.) via a network 160 to the server 143 and a timestamp corresponding to "$B_S$" is generated and sent to the logging machine 173. Performance metrics during the increment in time between A and $B_S$ may be recorded using instrumentation and/or event tracing for the machine 113.

At time "$B_R$" the server 143 receives the information and a timestamp is generated and sent to the logging machine 173. Continuing with the example of FIG. 2, at time "C" the server 143 requests information from a database 150 where instrumentation on the server-side component of the distributed application and/or operating system level event tracing per a module 149 (ET-S) issue a timestamp corresponding to time "C" for the request for information from the database 150. Performance metrics during the increment in time between $B_R$ and C (i.e., outbound server interval) may be recorded using instrumentation and/or event tracing for the machine 143.

At some point in time "D", the server 143 receives a response from the database 150 where server-side instrumentation and/or operating system level event tracing issue a timestamp corresponding to time "D" to the logging machine 173. The server 143 may perform additional computing tasks depending on the nature of the information received from the database 150 and/or the information sent by the user 110. Information associated with processing that occurs between time of event "D" and a time of a server send event "$E_S$" may be issued by server-side instrumentation and/or operating system level event tracing from the server 143 to the logging machine 173. After the server 143 sends information to the machine 113, the machine 113 issues a timestamp corresponding to "$E_R$" to the logging machine 173 using client-side instrumentation and/or operating system level event tracing.

In the example of FIG. 2, communication of information to the logging machine 173 may occur via the network 160 or via another network. Further, the server 143 and/or the machine 113 may substitute for the logging machine 173. In other words, the server 143 and/or the machine 113 may include features for collection of information associated with performance of a distributed application.

Figure 3:
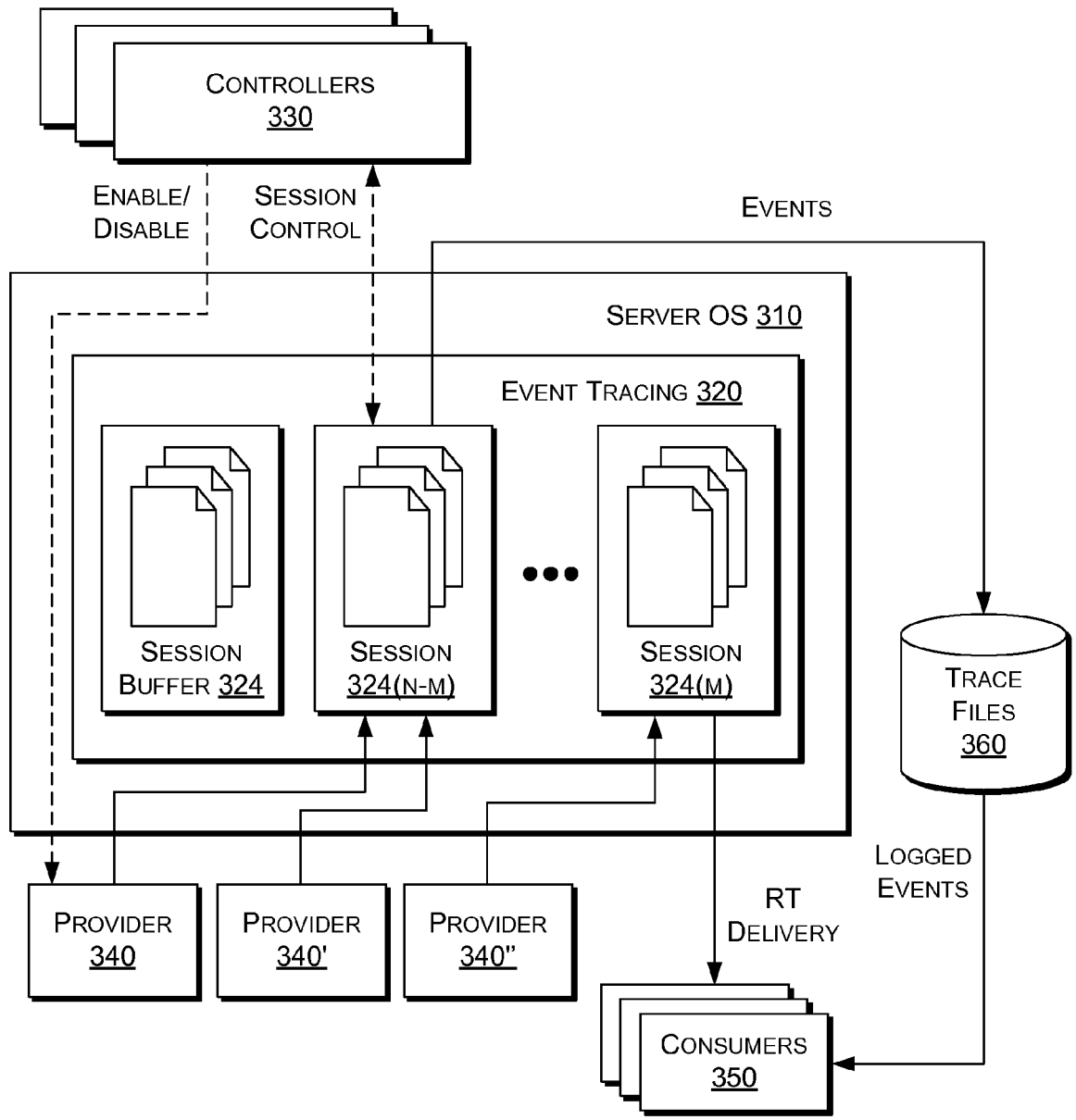
FIG. 3 is a diagram of an event tracing architecture.

In general, event tracing at the operating system level is optional and provides additional information beyond that provided by instrumentation of one or more components of a distributed application. FIG. 3 shows an event tracing architecture 300 for an operating system 310 suitable for use in the module ET-C 119 and/or the module ET-S 149 of the system 200 of FIG. 2.

As shown in FIG. 3, the architecture 300 includes an event tracing module 320 that functions in conjunction with the operating system 310. The architecture 300 includes four main types of components: controllers 330, event providers 340, consumers 350, and event trace sessions 324. Buffering and logging take place in event tracing sessions 324, which accept events and create a trace file 360. A number of logging modes typically exist for ET sessions. For instance, a session can be configured to deliver events directly to consumer applications 350 or to overwrite old events in a file 360 by wrapping around when a certain size is reached. A separate writer thread created for each session can flush them to a trace file 360 or to real-time consumer applications 350. To enable high-performance, per-processor buffers can be used to eliminate the need for a lock in the logging path.

An event provider 340 is a logical entity that writes events to ET sessions 324. Any recordable activity of significance can be an event, and each is represented by an event logged to ET. An event provider 340 can be a user-mode application, a managed application, a driver, or any other software entity. In general, an event provider 340 must register a provider ID with ET 320 through a registration API. A provider 340 first registers with ET 320 and writes events from various points in the code by invoking an ET logging API. When a provider is enabled dynamically by the ET controller application 330, calls to the logging API can send events to a specific trace session 324 designated by the controller 330. Each event sent by the event provider 340 to a trace session 324 can include a fixed header that includes, for example, event metadata and additional variable user-context data. Due to growing use of event instrumentation in many OS components, even a simple application may already contain several components that are event providers 340.

When an event is logged to a session, the ET module 320 can add data items optionally along with other information. Such items can include a timestamp, process and thread ID, processor number, or CPU usage data of the logging thread. These data items can be recorded in an ET event header and passed on to event consumers 350 optionally along with the variable event content given by a provider 340. Many trace consumers 350 find these data fields to be helpful in performance analyses.

A controller 330 can start and stop ET sessions 324 and enable provider 340 access to ET sessions 324. In some scenarios, such as debugging and diagnosis, a controller tool may be invoked, as needed, to collect in-depth traces. In contrast, for events such as admin-targeted events that need to flow to an event viewer at all times, providers 340 may be enabled automatically by an event log service when the providers 340 register. In general, a controller 330 must have ET permission on the operating system 310 to control sessions, which is typically given to only a small group of privileged users by default.

In the example of FIG. 3, a consumer 350 is an application that can read log files or listen to a session 324 for real time events. Event consumption is typically callback-based; a consumer 350 registers an event callback, which the ET module 320 calls with one event at a time. Events are typically delivered to the ET consumer 350 in chronological order. General-purpose event consumer tools can optionally dump events into any of a variety of formats. For example, an XML dump of a "Process" event logged by a kernel provider may be generated by an appropriate tool on the underlying OS. Since events often contain custom user content logged by a provider 340, some type of metadata may be needed for decoding. A provider 340 using certain APIs may be expected to supply an event manifest, an XML file that defines all events that providers write along with their layout information. A general-purpose consumer application 350 may use Trace Data Helper (TDH) APIs to retrieve the event metadata, decode the events, and display them.

To many, tracing means collecting events from certain providers of interest. In this way of thinking, an event trace session 324 is tied to one or more providers 340 in a conceptual collection as a whole, and a session itself (the logging engine) is often overlooked. The ET architecture 300 allows for more dynamic and flexible trace and event management. Here, sessions 324 and providers 340 exist in different spaces. A controller 330 is the one that starts and stops ET sessions 324 and enables providers 340 to sessions dynamically. Thus, a controller 330 can choose to enable a group of providers to a session, disable some of them after a while, and enable another provider to that same session later. Sessions 324 operate in a kernel and are not statically tied to providers 340. Likewise, providers 340 typically are not aware of which sessions 324 their events are being logged to. There are large scale applications and services that are providers 340, controllers 330, and consumers 350 all at the same time.

In the architecture 300, APIs may be provided for all operations of the controllers 330, providers 340, and consumers 350, and applications may assume any combination of roles. In conventional event tracing, however, developers implement only event providers 340 and use associated event tracing tools to collect traces and view them.

Separation of providers 340 and trace sessions 324 allows tracing to become immune to application problems, such as crashes. Events logged by providers 340 before a crash normally reside in kernel memory or trace file 360, which makes this particularly useful for debugging application anomalies.

The event tracing architecture can be used by developers, IT administrators, and management-tool developers for debugging, monitoring, diagnosis, and capacity planning. The usual analysis methodologies based on events can be categorized into the following techniques: Scanning (e.g., through an event dump); Delta Analysis (e.g., via timestamp and CPU usage numbers for each event); Property (Event B)-Property (Event A) (e.g., to allow for response time and CPU usage statistics of application activities); Statistical Analysis (e.g., counting certain events for insight into software behavior); State Machine and Resource Tracking (construction of a state machine and in turn, a simulation based on traces); and End-to-End Tracing (e.g., an application that includes a number of distributed components integrated via complicated interconnections).

In general, conventional event tracing requires instrumentation points to be added throughout an application's components. These record activities along with a unique ID for the request currently being served. After traces are collected, events that correspond to the same request are correlated during event consumption so that activity related to the request and its progress can be tracked. Later, specific requests of interest can be looked at individually for problems in different service stages, or a group of requests can be summarized through statistical analysis.

As described herein, various exemplary techniques include instrumentation of components to facilitate correlation of events. Hence, such techniques can eliminate burdensome post-hoc correlation. In addition, various exemplary techniques can operate in conjunction with event tracing. For example, event tracing information for a particular computing device may be immediately correlated with a timestamp generated by instrumentation of a component of a distributed application where the latter provides a common timeline for the entire distributed application. The combination of instrumentation and event tracing thus offers insight into performance otherwise unavailable using event tracing alone.

Figure 4:
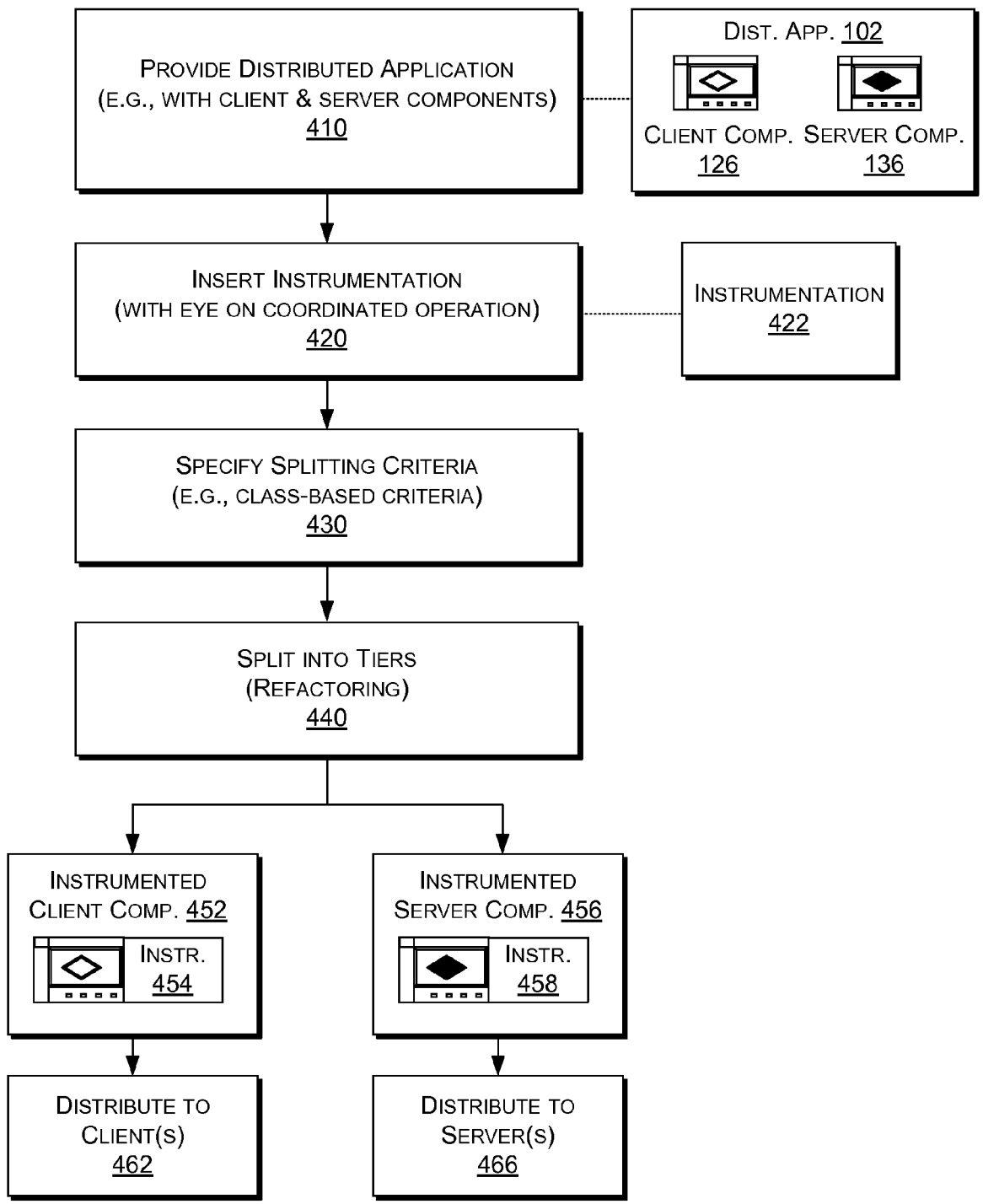
FIG. 4 is a block diagram of an exemplary method for instrumenting components of a distributed application.

FIG. 4 shows an exemplary method 400 for instrumenting a distributed application. In a provision block 410, a distributed application 102 is provided that includes, for example, a client-side component 126 and a server-side component 136. An instrumentation block 420 inserts instrumentation 422 into the application 102. In particular, the instrumentation inserted accounts for client-side and server-side aspects of the distributed application 102 such as data transfer, call and response, coordinated action, etc., which may help in assessing performance and/or debugging the distributed application 102.

After instrumentation, a specification block 430 specifies one or more criteria to split the distributed application 102 into properly instrumented components (e.g., client-side and server-side components). Class information for underlying client-side and server-side components may be used as criteria for splitting. For example, the Volta refactoring tools can be used to split a distributed application (e.g., tier splitting). According to the example of FIG. 4, a splitting block 440 uses one or more criteria to split the distributed application 102 into an instrumented client component(s) 452 with client-side instrumentation 454 and an instrumented server component(s) 456 with server-side instrumentation 458. Distribution blocks 462 and 466 distribute (e.g., deploy) the instrumented components as appropriate.

Figure 5:
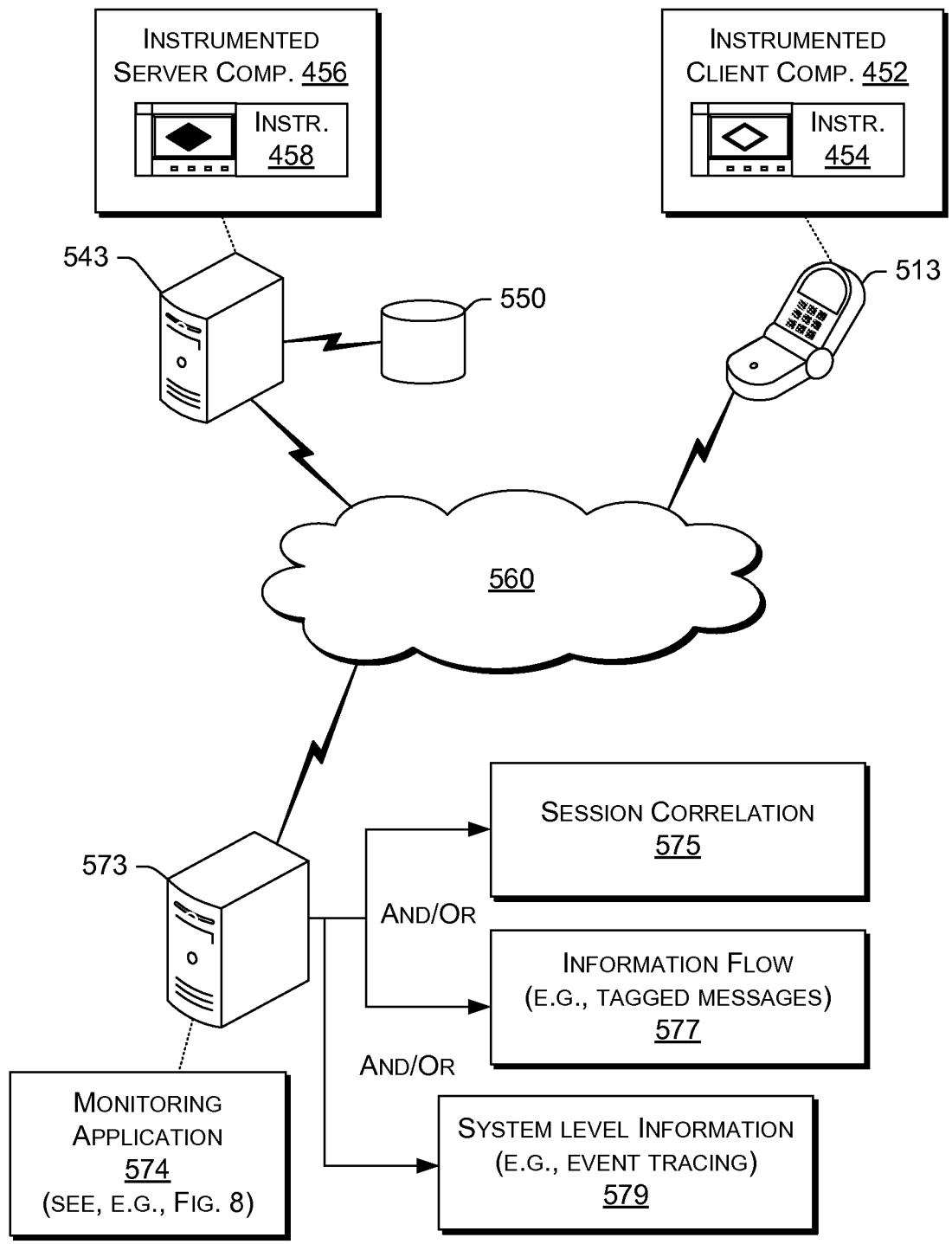
FIG. 5 is a diagram of an exemplary system for monitoring information related to performance of a distributed application.

FIG. 5 shows an exemplary system 500 for monitoring one or more instrumented components of a distributed application. As already explained with respect to FIG. 4, a distributed application includes one or more instrumented components such as the instrumented client component 452 and the instrumented server component 456. In the example of FIG. 5, the server component 456 executes on a server 543 that can access one or more databases 550 and the client component executes on a client device 513, which may be a computer, a lightweight device, etc. The server 543 and the client device 513 are in communication via a network 560, which also provides a communication link to a logging server 573.

The logging server 573 includes a monitoring application 574 that allows for correlation of session information 575, information flow monitoring 577 and/or system level information monitoring 579.

While the example of FIG. 5 depicts the client device 513 as a cell phone, similar systems can exist for any of a variety of environments. For example, a home network that includes distributed applications for controlling household appliances (e.g., refrigerator, heater, air conditioner, security system, etc.) may include the monitoring application 574 for purposes of correlation of session information 575, information flow monitoring 577 and/or system level information monitoring 579. Such monitoring can allow for enhanced control of the various home appliances. Such exemplary monitoring techniques may also be implemented in other environments (e.g., process control for factories, etc.). Of course, such exemplary monitoring techniques are particularly useful for Web 2.0 applications.

Figure 6:
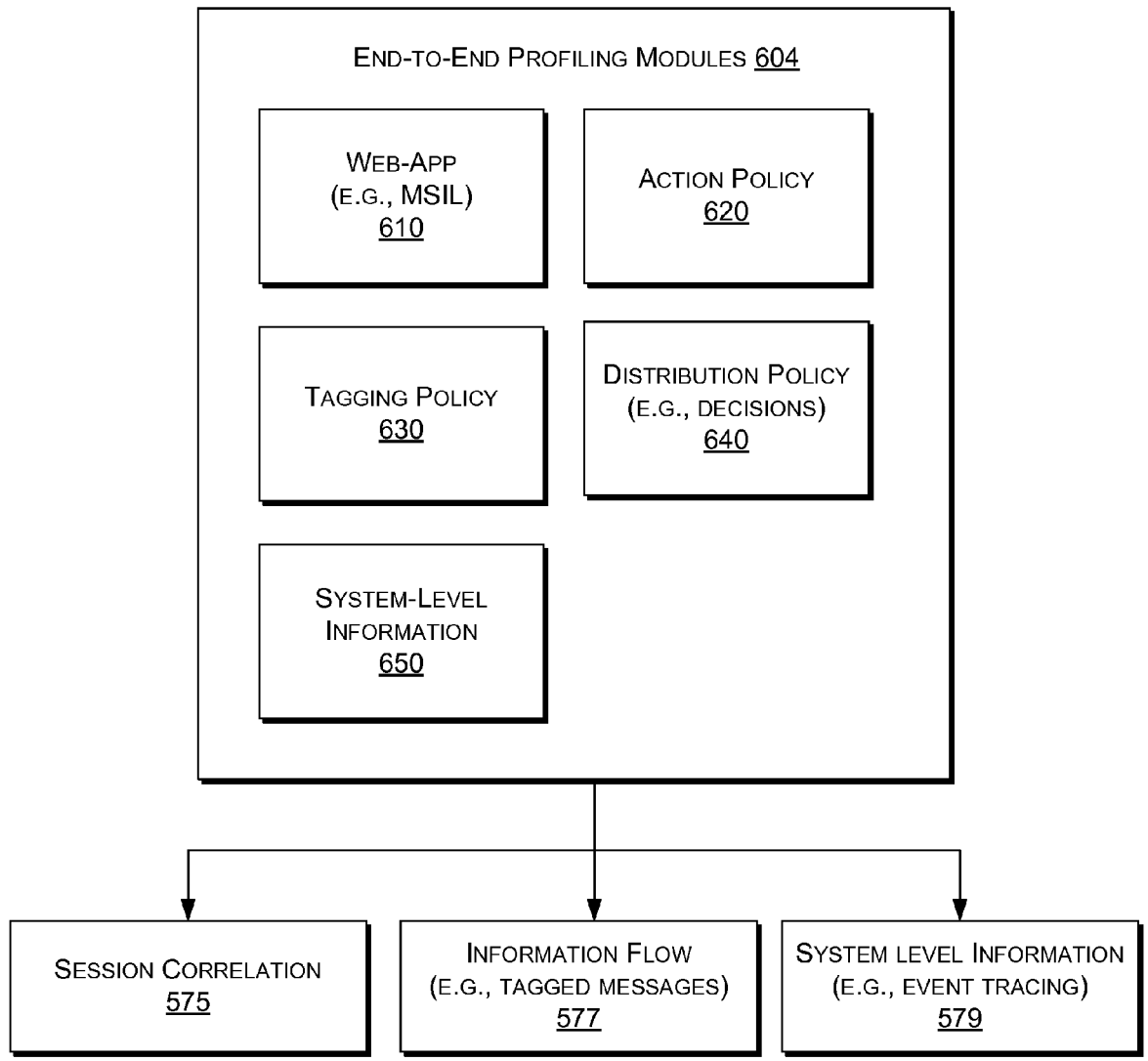
FIG. 6 is a block diagram of an exemplary architecture for data-driven profiling of a distributed application.

FIG. 6 shows an exemplary architecture 600 for end-to-end profiling of a distributed application. The architecture 600 includes a variety of modules such as a Web-application module 610, an action policy module 620, a tagging policy module 630, a distribution policy module 640 and a system-level information module 650. The modules 604 allow for correlation of session information 575, information flow monitoring 577 and/or system level information monitoring 579.

The Web-application module 610 allows for analysis of applications written in of a variety of programming languages. For example, the module 610 may receive code written in one or more languages associated with the .NET framework that can be represented in intermediate language (e.g., MSIL) that targets a common language runtime (CLR). In this example, code for a server component may be written in C# and then represented in MSIL while code for a client component may be written in Visual Basic (Microsoft Corp.) and then represented in MSIL.

The action policy module 620 and the tagging policy module 630 are described in more detail with respect to FIG. 7. The distribution policy module 640 can make decisions as to refactoring and distribution of instrumented or other components to appropriate devices for execution. The system-level information module 650 allows for tasks such as event tracing, as explained with respect to the event tracing architecture 300 of FIG. 3.

FIG. 7 shows some statements associated with the action policy 620 and some statements associated with the tagging policy 630. In general, the action policy 620 defines actions of interest with respect to various tiers of a distributed application. For example, an action policy 620 may set policies for actions occurring at a client tier, a Web-server/service tier and a database tier. In the example of FIG. 7, the action policy 620 statements include an XHR-Open statement that references an API of a unified framework, such as Volta. XHR (XMLHttpRequest) is an application program interface (API) and a component of AJAX. The action policy 620 also includes several datastore related statements (e.g., database tier) that reference LINQ, which stands for Language Integrated Query (Microsoft Corp.). LINQ adds a native querying syntax reminiscent of SQL to the .NET framework programming languages (e.g., Visual Basic.NET and C# languages). The action policy 620 also includes a user input event statement (e.g., client tier) that references Volta tools and a Web-method statement for Web-method attributes (e.g., Web-service tier). The XHR API calls, LINQ statements, user-input events, and Web-method statements all represent certain types of actions that could potentially be of interest to developers monitoring the application for performance-related issues.

The tagging policy 630 pertains to mechanisms to "tag" data or commands. This allows developers to view performance issues in the context of data-flow through the system. For example, data sent by a client device may be tagged so developers can discover where in the application it is encountering a performance bottleneck. Tagging attaches an identifier to data or a command such that information can be gathered about the data or the command as it travels or operates in a distributed environment. In the example of FIG. 7, the tagging policy 630 includes sources of input to be tagged and enumerates statements that propagate tags.

Figure 8:
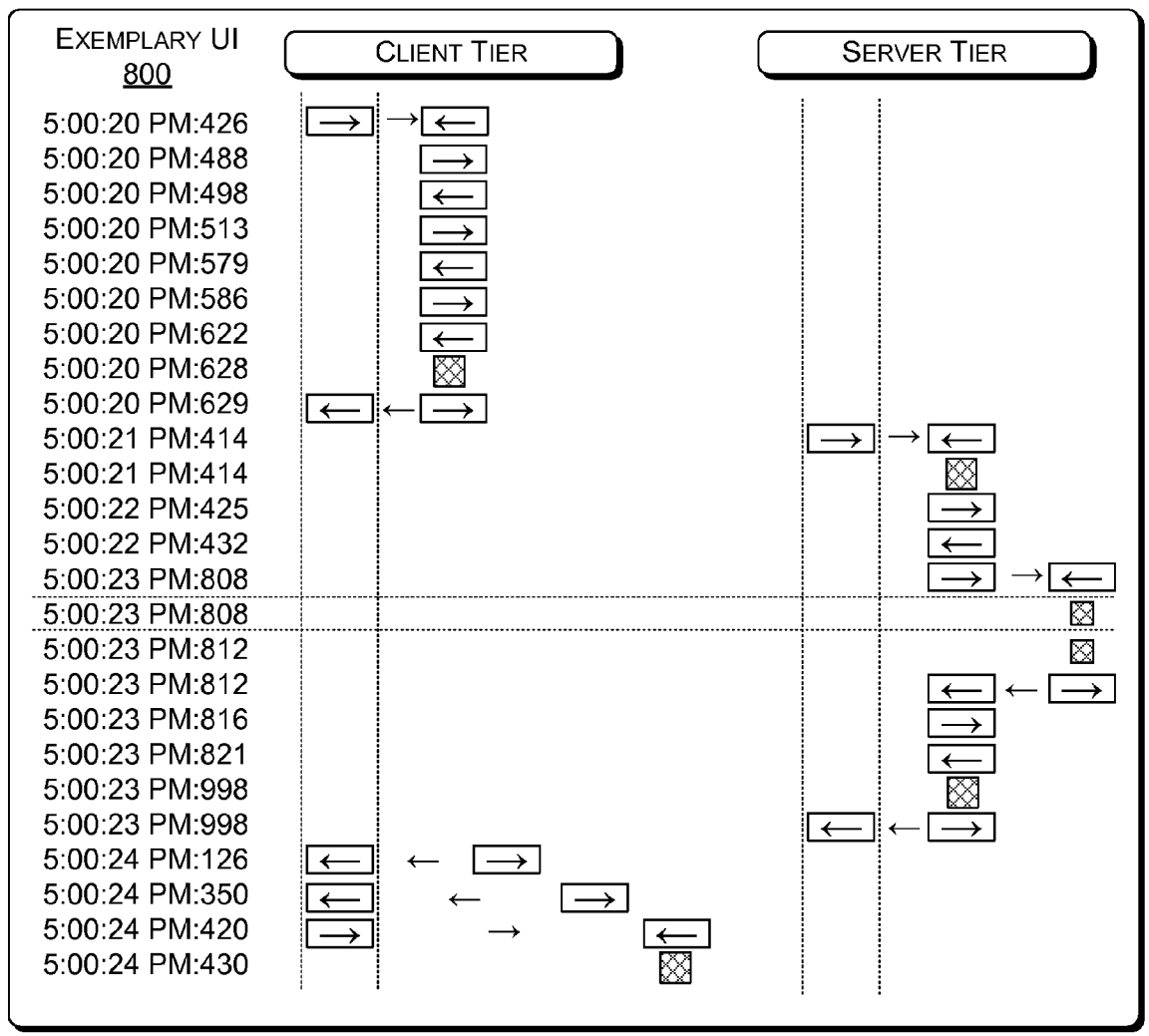
FIG. 8 is an exemplary graphical user interface (GUI) for monitoring information related to a distributed application.

FIG. 8 shows an exemplary graphical user interface (GUI) 800 for display of information about execution of a distributed application with respect to a client tier and a server tier. The GUI 800 shows a common time line for the environment that includes a client device and a server. Again, in conventional systems, a common time line must be reconstructed based on correlation of individual timings of a client device and a server. Such a conventional approach can be burdensome and fraught with errors. In the example of FIG. 8, the GUI 800 indicates client-side processing from time 5:00:20 PM:426 to 5:00:20 PM:629. From 5:00:20 PM:629 to 5:00:21 PM:414, network transmission occurs between the client device and the server. From 5:00:21 PM:414 to 5:00:23 PM:998, processing occurs at the server, for example, as related to a Web-service that the client is using. At 5:00:23 PM:998, the server transmits information to the client and at 5:00:24 PM:126, the client processes information received from the server.

As described herein, instrumentation of components of a distributed application allows for collection of such information, which, in turn, can allow for assessment of performance of the distributed application. At a most basic level, instrumentation causes issuance of timestamps, as discussed with respect to FIG. 2. However, via tagging and/or or event tracing, additional information may be acquired about execution of a distributed application.

FIG. 9 shows an exemplary client-side information table 910 and an exemplary server-side information table 930. The tables 910 and 930 include system events, control flow events and information flow events, organized in a logical fashion as they occur on a client device or a server. Referring again to the GUI 800, such information may be presented in an exemplary GUI, for example, by selecting an option to "Show Client-Side Actions" or "Show Server-Side Actions". An exemplary GUI may allow for filtering information about a distributed application. For example, a filter may include an option to "Show DB Related Actions" or "Web-Method Information" or "ASP.NET Requests". Yet further, an exemplary GUI may allow for overlying system level information and component information. For example, a particular component process may be slow due to an underlying system level issue. When the GUI displays component timestamp information with system level event tracing information, a developer may more readily diagnose performance bottlenecks. In general, the various aforementioned features can assist in assessing performance of a distributed application as well as optimizing performance of the distributed application. Optimization may include revising code, adding code, selecting network channels, selecting server locations, selecting server equipment, etc.

FIG. 10 shows exemplary client-side instrumentation 1010 for actions and information flow. In the example of FIG. 10, the distributed application implements "dictionary suggest" functionality: as the user is typing into a text box, dictionary words starting with that prefix are constantly displayed. For the class Program, instrumented action occurs around an input value, where information flow occurs for the input value. For the class Dictionary, instrumented action occurs for an if/then statement and a request statement.

FIG. 11 shows exemplary server-side instrumentation 1030 for custom actions, general actions and information flow. In the example of FIG. 11, the distributed application pertains to a dictionary suggest operation. For the Public Class Dictionary, instrumented custom action occurs around a subroutine "Sub New( )" and general action occurs around a selection statement associated with a dictionary. Other general action occurs for the Public Function Completions and specifically for a "where" statement and a "completions" statement (e.g., "Matches.Take(Count)"). Information flows into the first argument of the function "Completions".

Figure 12:
FIG. 12 is an exemplary code segment that includes Web-service interface instrumentation.

FIG. 12 shows exemplary Web-service interface instrumentation 1050 for actions and information flow. Actions occur for the function "Completions" and information flow occurs for parameter Prefix of the function "Completions".

FIG. 13 shows the exemplary system 200 in conjunction with an exemplary method 1300. The method 1300 includes a series of events A-E, which are labeled in the system 200 and associated with method steps 1304-1324. In general, the method uses sequence IDs in a header, which can be stored in a logging server and organized as a group of events. As already explained, instrumented components can generate information related to any of a variety of events. Depending on features of a logging device, the information (e.g., timestamps and/or other information) can be examined in real-time and/or at a later time. Further, post-processing may occur to group or filter generated information. In situations where user privacy is a concern, generation or collection may be limited to generic information such as timestamps (e.g., as opposed to information about what a specific client input or Web-service returned).

The exemplary method 1300 includes a user input related step 1304 that corresponds to label "A". At user input on a client device 113, the instrumentation responds to input by a user 110 by assigning an appropriate sequence ID. In addition, on a page load or application restart, the instrumentation assigns a session ID and initializes appropriate sequence IDs. Instrumentation information may be organized according to parameters such as Session ID, Sequence ID, Timestamp and Message. In the example of FIG. 13, after input and page load, a send step 1308 that corresponds to label "B" executes an XHR-Send where instrumentation sets an HTTP header for the appropriate session and sequence. At the server 143, a Web-method entry step 1312 extracts the session and sequence from the HTTP header and stores header information in, for example, thread-local storage.

As is common in Web applications, information must be retrieved from a data store such as the database 150 which receives a command (label C) and responds to the command by transmitting data (label D). Accordingly, a database step 1316 represents a data query and transmission of data. With the data from the database, the Web-method can now perform appropriate action that implements the logical functionality of the application. Next, in a Web-method exit step 1320, Web-service instrumentation sets one or more corresponding response headers. Finally, in a response step 1324 (label E), instrumentation associated with an XHR-Response event on the client-side sets a sequence ID to correspond to the sequence ID in the HTTP header.

In general, the method 1300 demonstrates how information is tracked via parameters like a Sequence ID and a Session ID, and that can be associated with timestamps and optionally other information. As already explained, instrumentation in components of a distributed application allow for such tracking and thereby allow for monitoring performance of a distributed application.

Figure 14:
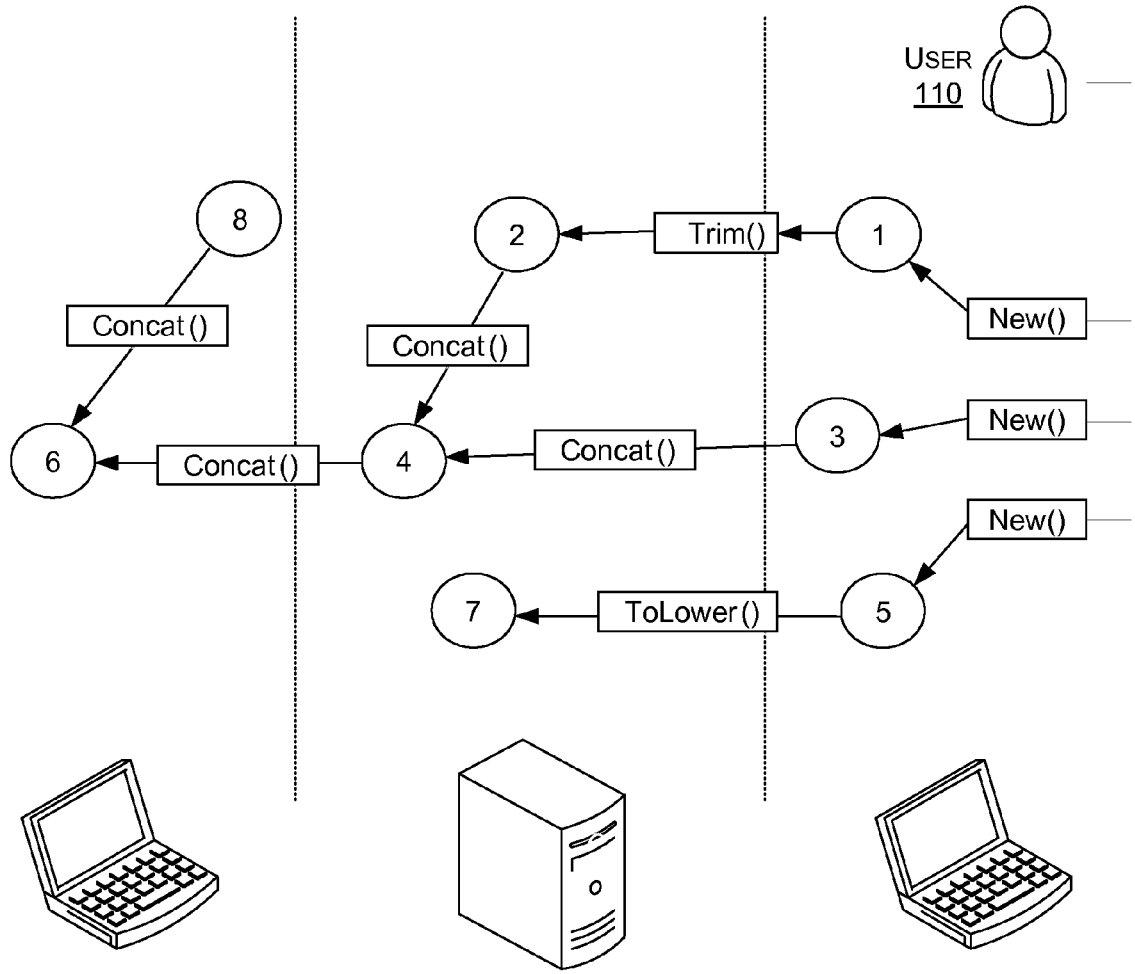
FIG. 14 is a diagram of an exemplary method for monitoring information flow.

FIG. 14 shows an exemplary method 1400 that tags information such as input data from a user 110. The method 1400 is shown as an information flow graph with a distributed series of events and associated actions across two client devices and a server. In this example, instrumentation marks every piece of input from the user 110 with a tag. As the information is transmitted and/or processed, a logging device (e.g., a logging server) collects the events associated with the tagged information to generate an information flow graph that may be displayed via an exemplary GUI. Use of an information flow graph allows for a more natural presentation to a developer, especially for data driven applications. In particular, an information flow graph can explicitly indicate point to point interactions and data flow. Such a presentation allows a developer to more readily assess data driven performance of a distributed application.

FIG. 15 shows the exemplary system 200 in conjunction with an exemplary method 1500 that includes tagging data. The method 1500 includes a series of events A-E, which are labeled in the system 200 and associated with method steps 1504-1524. The method 1500 commences in a user data input step 1504 (label A) where instrumentation tags an input string object. At step 1508, the client machine 113 may record the information in the form of a vector, array or other organized form where one or more objects are associated with a timestamp, a sequence ID and a session ID.

In a request user data step 1512 (label B), the client machine 113 requests information from a Web-service on a server 143. At step 1516, the server machine 143 may receive the recorded sequence ID and/or Session ID as associated with one or more objects and, in turn, issue a timestamp. In the example of FIG. 15, the server 143 interacts with a database 150 (labels C and D), which may generate additional information per any associated instrumentation. In an update step 1524, the server 143 transmits, for example, an updated page to the client machine 113.

FIG. 15 also shows some instrumentation statements 1570 that can be added to one or more components of a distributed application. For example, the statements 1570 include a URL request statement, a client-side statement and a server-side statement. The client-side statement provides for setting an HTTP tag header while the server-side statement provides for responding to an HTTP tag header.

As described herein, information collected from an instrumented distributed application can be used to evaluate or suggest better tier-splitting decision. An exemplary method collects information from an instrumented multi-tier distributed application and analyzes the information as to tier-splitting. Such a method may analyze performance of the application as currently split and recommend a different splitting strategy that can enhance performance. For example, where some flexibility exists, certain tasks may be performed more expeditiously at a different tier. Such a method optionally acts in an automate fashion to evaluate current or suggest better tier-splitting decisions.

An exemplary method for monitoring distributed applications, implemented in part by a computing device, includes receiving timestamps from multiple tiers of a distributed application wherein each timestamp comprises an associated event, based in part on the received timestamps, correlating two or more events associated with execution of the distributed application across multiple tiers; and assessing performance of the distributed application based in part on the correlating of two or more events. For example, one tier may be a client tier and another tier a server tier, where a logging server receives timestamps from the client tier and the server tier. As described herein, instrumentation allows for generating timestamps for any of a variety of events. Further, such instrumentation allows for assessing performance along a common timeline.

An exemplary distributed application can include of a tier that generates a timestamp when the software component of that tier calls for sending information to another tier of the distributed application. An exemplary distributed application can include a tier that generates a timestamp when a software component of that tier receives information from another tier of the distributed application. For example, an instrumented software component of the distributed application can generate a timestamp when the component receives information from a database. As described herein, an exemplary method can include monitoring events generated at an operating system level of a computing device.

Various exemplary techniques include an instrumented software component of a distributed application that includes instrumentation to tag data where tagging of data allows for tracking propagation of the data.

An exemplary method for generating an instrumented distributed application includes writing unified code for multiple tiers of a distributed application destined for execution on a computing device at each tier of the multiple tiers, instrumenting the unified code to generate event timestamps, splitting the instrumented unified code into instrumented code for execution at each of the multiple tiers and deploying the instrumented code to the multiple tiers of the distributed application.

As described herein, an entire distributed application may be instrumentated (e.g., in a single instrumenting process) and then split into portions for execution at particular tiers (e.g., refactored) or it may be split into portions for execution at particular tiers and then instrumented, for example, prior to deployment.

An exemplary method for tracking information during execution of a distributed application includes instrumenting code for a tier of the distributed application with code to tag data where tagging allows for tracking propagation of tagged data throughout the distributed application and instrumenting code for another tier of the distributed application with code to respond to tagged data.

Figure 16:
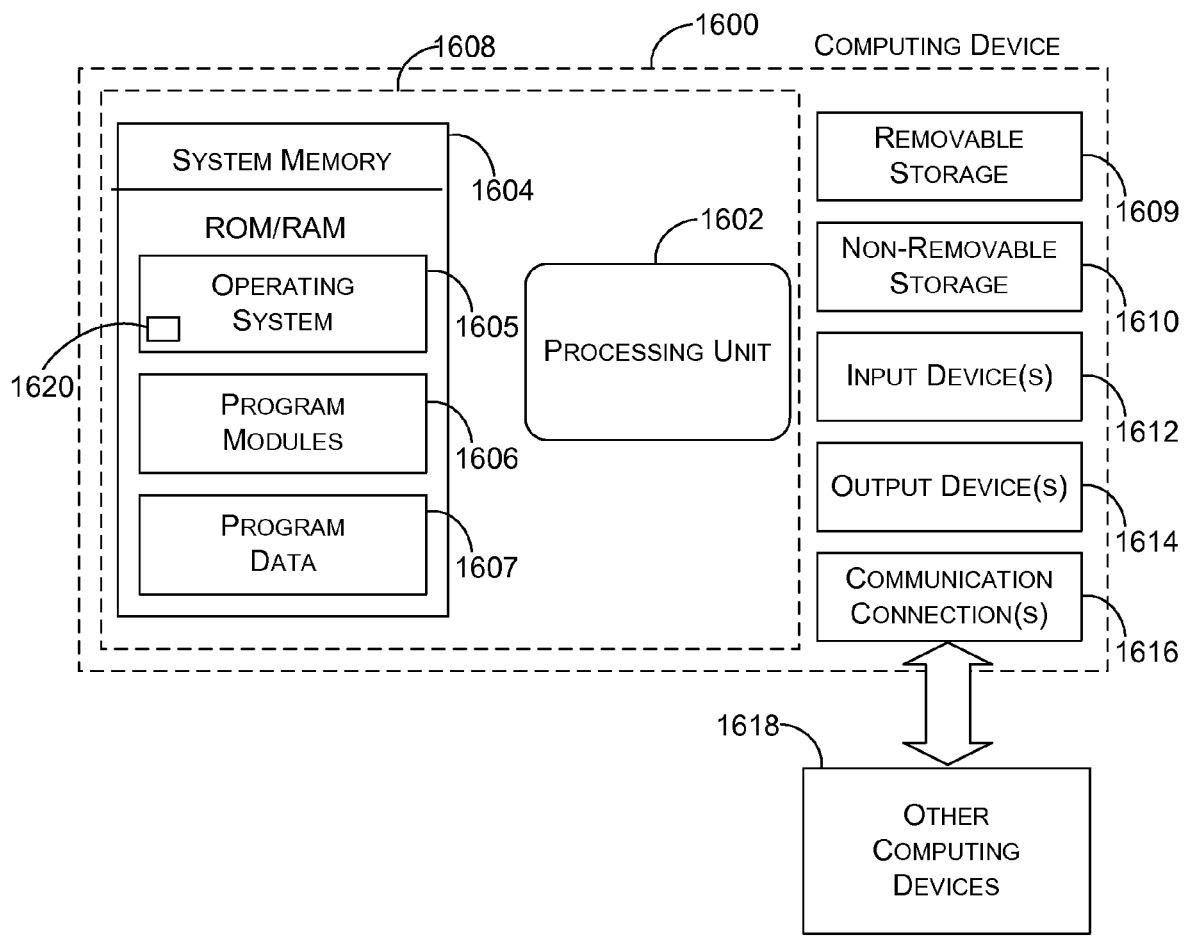
FIG. 16 is a block diagram of an exemplary computing device.

FIG. 16 illustrates an exemplary computing device 1600 that may be used to implement various exemplary components and in forming an exemplary system. For example, the servers and clients of the system of FIG. 1 may include various features of the device 1600.

In a very basic configuration, computing device 1600 typically includes at least one processing unit 1602 and system memory 1604. Depending on the exact configuration and type of computing device, system memory 1604 may be volatile (such as RAM), non-volatile (such as ROM, flash memory, etc.) or some combination of the two. System memory 1604 typically includes an operating system 1605, one or more program modules 1606, and may include program data 1607. The operating system 1605 include a component-based framework 1620 that supports components (including properties and events), objects, inheritance, polymorphism, reflection, and provides an object-oriented component-based application programming interface (API), such as that of the .NET™ Framework manufactured by Microsoft Corporation, Redmond, Wash. The device 1600 is of a very basic configuration demarcated by a dashed line 1608. Again, a terminal may have fewer components but will interact with a computing device that may have such a basic configuration.

Computing device 1600 may have additional features or functionality. For example, computing device 1600 may also include additional data storage devices (removable and/or non-removable) such as, for example, magnetic disks, optical disks, or tape. Such additional storage is illustrated in FIG. 16 by removable storage 1609 and non-removable storage 1610. Computer storage media may include volatile and nonvolatile, removable and non-removable media implemented in any method or technology for storage of information, such as computer readable instructions, data structures, program modules, or other data. System memory 1604, removable storage 1609 and non-removable storage 1610 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1600. Any such computer storage media may be part of device 1600. Computing device 1600 may also have input device(s) 1612 such as keyboard, mouse, pen, voice input device, touch input device, etc. Output device(s) 1614 such as a display, speakers, printer, etc. may also be included. These devices are well know in the art and need not be discussed at length here.

Computing device 1600 may also contain communication connections 1616 that allow the device to communicate with other computing devices 1618, such as over a network (e.g., consider the aforementioned network 160 of FIG. 1). Communication connections 1616 are one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for monitoring distributed applications executed by a processor, the method comprising:
  receiving timestamps from multiple tiers of a distributed application, the multiple tiers comprising a server tier that includes a server that hosts a server component of the distributed application, and a client tier that includes a plurality of client devices, each of the client devices hosting an instance of a client component of the distributed application, each timestamp comprising an associated event;
  receiving tags from the multiple tiers to monitor propagation of data related to the associated event through the multiple tiers;
  receiving action statements from the multiple tiers to flag certain types of actions related to the associated event;
  logging the associated event into an event tracing session that is statically unrelated to providers of the multiple tiers such that one or more providers may be disabled prior to an end of the event tracing session and at least one additional provider is added to the event tracing session following the one or more providers being disabled;
  based in part on the timestamps, correlating two or more events associated with execution of the distributed application across multiple tiers;

assessing performance of the distributed application based in part on the correlation of the two or more events; and generating a graphical user interface, the graphical user interface including an option to display timestamps related to a combination of the multiple tiers and an option to display timestamps related to individual ones of the multiple tiers.

2. The method of claim 1 further comprising instrumenting software components of the distributed application wherein each of the software components executes on a respective tier.

3. The method of claim 2 further comprising refactoring the distributed application.

4. The method of claim 1 wherein the receiving timestamps includes receiving a timestamp that is generated by an instrumented software component of a tier of the distributed application when the instrumented software component calls for sending information to another tier of the distributed application.

5. The method of claim 1 wherein the receiving timestamps includes receiving a time stamp that is generated by an instrumented software component of a tier of the distributed application when the software component receives information from another tier of the distributed application.

6. The method of claim 1 wherein the receiving timestamps includes receiving a time stamp generated by an instrumented software component of a tier of the distributed application in response to occurrence of the associated event.

7. The method of claim 1 wherein the multiple tiers further comprises a database tier, and wherein the receiving timestamps includes receiving a timestamp that is generated by an instrumented software component of the distributed application when the instrumented software component receives information from a database in the database tier.

8. The method of claim 1 further comprising monitoring events generated at an operating system level of a computing device.

9. The method of claim 1 further comprising identifying performance bottlenecks for the distributed application based at least in part on the timestamps.

10. The method of claim 1 wherein an instrumented software component of the distributed application comprises instrumentation to generate sequence IDs.

11. The method of claim 1 wherein an instrumented software component of the distributed application comprises instrumentation to generate session IDs.

12. The method of claim 1 wherein an instrumented software component of the distributed application comprises instrumentation to tag data.

13. The method of claim 1 wherein the multiple tiers further comprise a database tier.

14. The method of claim 1 wherein the assessing performance comprises profiling performance of the distributed application.

15. A computer-readable memory storing computer-executable instructions that, when executed, cause one or more processors to perform acts comprising:

receiving timestamps from multiple tiers of a distributed application, each timestamp corresponding to an event that is provided by a provider in a tier;

receiving tags from the multiple tiers to monitor propagation of data related to the events through the multiple tiers;

receiving action statements from the multiple tiers to flag certain types of actions related to the events through the multiple tiers;

logging the events into an event tracing session that is statically unrelated to providers in the multiple tiers such that one or more providers may be disabled prior to an end of the event tracing session and at least one additional provider is added to the event tracing session following the one or more providers being disabled;

based in part on the timestamps, in part on the received tags, and in part on the action statements, correlating two or more events associated with execution of the distributed application across multiple tiers;

assessing performance of the distributed application based in part on the correlation of the two or more events; and generating a graphical user interface, the graphical user interface including an option to display timestamps related to a combination of the multiple tiers and an option to display timestamps related to individual ones of the multiple tiers.

16. The computer-readable memory of claim 15 wherein the two or more events occur along a common timeline.

17. The computer-readable memory of claim 15 wherein the receiving timestamps includes receiving a timestamp that is generated by an instrumented software component of a tier of the distributed application when the instrumented software component calls for sending information to another tier of the distributed application.

18. The computer-readable memory of claim 15 wherein the receiving timestamps includes receiving a time stamp that is generated by an instrumented software component of a tier of the distributed application when the software component receives information from another tier of the distributed application.

19. The computer-readable memory of claim 15 wherein the receiving timestamps includes receiving a time stamp generated by an instrumented software component of a tier of the distributed application in response to occurrence of an event.

20. A system comprising:

one or more processors configured by executable instructions to implement a server tier of a multiple tier distributed application, the server tier including:

a network interface to receive timestamps associated with events from a plurality of client tiers of the multiple tier distributed application, each timestamp corresponding to a time of one of the events;

an action policy component to flag certain types of actions related to the events through the multiple tiers;

a tagging component to tag data with a tag in order to monitor propagation of data through the plurality of client tiers;

a logging component to correlate two or more events associated with execution of the distributed application across multiple tiers of the multiple tier distributed application based in part on the received timestamps in part on the tags and to log the events into an event tracing session that is statically unrelated to providers in the multiple tiers such that one or more providers may be disabled prior to an end of the event tracing session and at least one additional provider is added to the event tracing session following the one or more providers being disabled; and an assessment component to assess data-flow through the distributed application based in part on the correlation of the two or more events; and an timeline component to display a timeline and at least one option to display timestamps related to a combination of the multiple tiers and at least one option to display timestamps related to individual ones of the multiple tiers.

* * * * *